United States Patent [19]

Miller

[11] Patent Number: 4,788,275

[45] Date of Patent: Nov. 29, 1988

[54] AROMATIC COPOLYESTER CARBONATE ENDCAPPED WITH CHROMANYL I COMPOUND

[75] Inventor: Kenneth F. Miller, Mt. Vernon, Ind.

[73] Assignee: General Electric Company, Mt. Vernon, Ind.

[21] Appl. No.: 945,738

[22] Filed: Dec. 23, 1986

[51] Int. Cl.[4] .............................................. C08G 63/76
[52] U.S. Cl. .................................... 528/179; 528/198
[58] Field of Search ............................... 528/179, 198

[56] References Cited

U.S. PATENT DOCUMENTS 4,238,596 12/1980 Quinn .................................. 528/179

FOREIGN PATENT DOCUMENTS 1152691 8/1983 Canada .

Primary Examiner—Harold D. Anderson
Attorney, Agent, or Firm—Martin B. Barancik

[57] ABSTRACT

An aromatic copolyestercarbonate having from about 35 to 95 mole percent ester content which comprises isophthalate or isophthalate and terephthalate units, said copolyestercarbonate endcapped with a compound of the formula

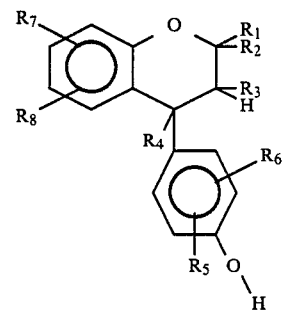

wherein $R_1$-$R_8$ are independently selected from the group consisting of hydrogen and alkyl radicals of 1–9 carbon atoms and wherein $R_5$-$R_8$ are further independently selected from the group consisting of bromo and chloro.

13 Claims, No Drawings

AROMATIC COPOLYESTER CARBONATE ENDCAPPED WITH CHROMANYL I COMPOUND

BACKGROUND OF THE INVENTION

Aromatic copolyestercarbonates have been known for many years. Their chief property improvement over polycarbonate is a higher distortion temperature under load, allowing it to be used in applications wherein higher temperature properties are required than standard polycarbonates. However, together with the higher temperature properties is the increased difficulty in molding. The melt viscosity is high, therefore requiring a higher temperature and/or more pressure to mold in comparison to the standard polycarbonates.

Various monofunctional groups have been employed to terminate polymers of the polycarbonate family. The standard endcapping monomers are pheno and paratertiary butylphenol. However, other endapping agents have been disclosed from time to time. In U.S. Pat. No. 3,697,481, Bialous, et al assigned to General Electric Company, a chromanyl radical has been employed to end-cap polycarbonates. The description of polycarbonates is broad enough to include copolyestercarbonates such as disclosed in U.S. Pat. Nos. 3,030,331 and 3,169,121, see the 3,697,481 U.S. Pat. No. at column 3, lines 59–69. In U.S. Pat. No. 4,238,596 issued to Quinn and assigned to General Electric Company, a new method for preparing copolyestercarbonates is disclosed. Following this new method, Examples 3 and 6 utilize chroman-I as a chain stopper. In Example 3, an aromatic copolyestercarbonate of 18 mole percent ester content in prepared utilizing 100 percent isophthalate units. In Example 6 an aromatic copolyestercarbonate is prepared having 11 percent ester content utilizing 100 percent terephthalate units. The data in the Tables in the U.S. Pat. No. 4,238,596 patent compares all of the examples. Reducing the ester content and going to chroman as the endcapping agent, see Examples 1–3, increases the Notched Izod. However, in Examples 4 and 6, which are 100 percent terephthalate content, the Notched Izod does not shift from Example 4 to Example 6. The only difference in the Examples is the chroman endcap compared with the phenol endcap. With respect to melt viscosity the melt index is somewhat higher in Example 3 than Examples 1 and 2 in the '596 patent wherein the ester content goes down but chroman replaces the phenol. In Examples 4 and 6 the melt index is lower in Example 6 than Example 4. In none of the Chroman endcapped examples is there a significant shift in distortion temperature under load to a higher value.

New aromatic copolyestercarbonates are being disclosed and patented. An example of such a copolyestercarbonate is found in U.S. Pat. No. 4,506,065 issued to Miller, et al and assigned to General Electric Company, wherein the specific content of the ester units and ester mole percent is emphasized. The standard methods for preparation is disclosed by reference to specific patents. These patents are U.S. Pat. Nos. 4,238,596, previously mentioned, and the U.S. Pat. No. 4,238,597 counterpart which were both incorporated into U.S. Pat. No. 4,506,065 by reference, see column 2, lines 58–61.

New chainstopped aromatic copolyestercarbonates have been discovered. These copolyestercarbonates end-capped with a member of the chromanyl family, preferably chromanyl-I, exhibit interesting processing and physical properties. These polymers can exhibit increased distortion temperature under load and improved impact resistance under normal conditions as well as under heat and aging conditions. Additionally, the lower viscosity chromanyl endcapped polymers show positive advantages in color retention and smaller loss in viscosity upon processing than the higher viscosity chromanyl endcapped polymers without sacrificing certain physical properties.

SUMMARY OF THE INVENTION

In accordance with the invention there is a composition comprising a chromanyl endcapped aromatic copolyestercarbonate, said copolyestercarbonate having from about 35 to about 95 mole percent ester content, said ester content comprising isophthalate and/or terephthalate units.

DETAILED DESCRIPTION OF THE INVENTION

Typical dihydric phenols which can be employed to prepare copolyestercarbonates of the invention are:
2,2-bis(4-hydroxyphenyl)propane (also known as bisphenol-A);
2,4'-dihydroxydiphenyl)methane;
bis(2-hydroxyphenyl)methane;
bis(4-hydroxyphenyl)methane;
bis(4-hydroxyphenyl-5-propylphenyl)methane;
bis(4-hydroxy-2,6-dimethyl-3-methoxyphenyl)methane;
1,1-bis(4-hydroxyphenyl)ethane;
1,1-bis(4-hydroxy-2-ethylphenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.

Bisphenols other than those having a carbon atom between the two phenols can also be used. Examples of such bisphenols include bis(hydroxyphenyl)sulfides, bis(hydroxyphenyl)ethers, and bis(hydroxyphenyl)sulfoxides, and the like.

The preferred family of dihydric phenols is illustrated below:

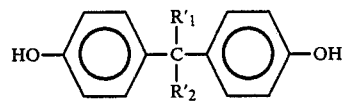

FIG. 1 wherein $R'_1$ and $R'_2$ are the same or different and are hydrogen or alkyl of one to eight carbon atoms, inclusive.

The aromatic copolyestercarbonates suitable for use in the present invention are derived from carbonate precursors and dihydric phenols which are also useful in the preparation of a comparable aromatic polycarbonate. However, more than one appropriate dihydric phenol may be used to prepare copolyestercarbonates of the invention. The aromatic dicarboxylic acid employed in the preparation of the copolyester carbonate is preferably isophthalic acid or mixtures of isophthalic and terephthalic acid. Any ester forming derivative of a carboxylic acid which is reactive with the hydroxyl of a dihyric phenol may be employed. The acid halides are generally employed because of their ease of reactivity and availability. The acid chlorides are preferred.

The standard methods for preparing copolyestercarbonate as indicated in all of the above noted documents and the state of the art preparations available in the journals can be employed to make the endcapped aromatic copolyestercarbonates of this invention. Generally, from about 2 to about 8 mole percent of the endcapping agent can be employed, preferably from about 3 to about 6 mole percent, most preferably 4 to 5 mole percent. The mole percent of the endcapping agent is based on the number of moles of dihydric phenol present.

The chroman family is illustrated in the figure below:

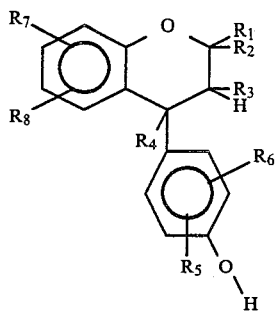

FIG. 2 wherein $R_1$–$R_8$ can be independently selected from the group consisting of hydrogen and alkyl radicals of 1–9 carbon atoms and wherein $R_5$–$R_8$ can be further independently selected from the group consisting of bromine and chlorine. The polymer is prepared by reacting a substituted chroman with a dihydric phenol and a carbonate precursor.

The substituted chroman as employed herein is chroman-I (2,2-4-trimethyl-4-(4-hydroxyphenyl)chroman) and the further substituted derivatives of Chroman-I wherein the substitution is as described above.

The substituted chromans that can be employed in the practice of this invention in addition to chroman-I are:

2,2,4,6-tetramethyl-4-(3,5-dimethyl-4-hydroxyphenyl)chroman, 2,3,4-trimethyl-2-ethyl-4-(4-hydroxyphenyl)chroman, 2,2,4-trimethyl-4-(3-nonyl-4-hydroxyphenyl)-7-nonylchroman, 2,2,4-trimethyl-4-(3,5-diethyl-4-hydroxyphenyl)-6-ethylchroman, 2,2,4,6,8-pentamethyl-4-(3,5-dimethyl-4-hydroxyphenyl)chroman, 2,2,4-triethyl-3-methyl-4-(4-hydroxyphenyl)chroman, 2,2,4-trimethyl-4-(3-bromo-4-hydroxyphenyl)chroman, 2-methyl-2,4 diethyl-4-(4-hydroxyphenyl)chroman;

2,3,4-trimethyl-3-ethyl-2-isobutyl-4-(4-hydroxy phenyl)Chroman-I;

2,4-diisobutyl-2-methyl-4-(4-hydroxyphenyl) Chroman-I;

2,2,4-trimethyl-4-(3-bromo-4-hydroxyphenyl)-6-bromo chroman, 2,2,4-trimethyl-4-(3,5-dibromo-4-hydroxyphenyl)-6-bromochroman and 2,2,4-trimethyl-4-(3,5-dibromo-4-hydroxyphenyl)-6,8-dibromochroman.

In the practice of this invention, the preferred substituted chroman is chroman-I.

The preferred aromatic copolyestercarbonates have above about 40, preferably 50 mole percent ester content. Of these preferred aromatic copolyestercarbonates it is preferred to have at least about 50 mole percent of the ester content be isophthalate, and more preferred to have greater than 80 percent of the ester content isophthalate. The remainder of the ester content is generally made up primarily of terephthalate.

Below are examples of the invention which are utilized to demonstrate the specific advantages and properties of the invention. These examples are intended to be illustrative and not narrow the broad inventive concept.

EXAMPLE 1

Bisphenol-A copolyestercarbonates having 40 mole percent ester content which was 100 percent terephthalate or 100 percent isophthalate were prepared using 3.2 mole percent of various chainstoppers and tested for a number of properties. Below are the results:

TABLE I

EFFECT OF 3.2 MOLE % CHAIN STOPPER ON PERFORMANCE FOR POLYTEREPHTHALATE CARBONATES

| PROPERTY | CHAIN STOPPER | | |
|---|---|---|---|
| | PHENOL | PTBP[1] | CHROMAN-1 |
| Tensile Yield (PSI) | 9693 | 9433 | 9266 |
| Tensile Break (PSI) | 12,810 | 12,930 | 13,590 |
| Tensile Elongation (%) | 68.1 | 68.3 | 78.4 |
| Flexural Yield (PSI) | 13,810 | 13,220 | 13,860 |
| Flexural Modulus (PSI) | 304,500 | 298,500 | 326,000 |
| DTUL (°C.) | 156.6 | 161.4 | 157.4 |
| .125 in. Notched Izod (ft.lbs./in.) | 8.0 | 6.9 | 8.0 |
| .250 in. Notched Izod (ft.lbs./in.) | 7.8 | 7.2 | 8.6 |
| .125 in. Double Gate Izod (ft.lbs./in.) | 37.3* | 36.6* | 38.6** |
| S-Tensile Impact (ft.lbs./in[2]) | 184 | 209 | 197 |
| Yellowness Index | 8.2 | 8.3 | 7.0 |
| Melt Viscosity (KI,6 min.) cs.[2] | 72,800 | 116,860 | 66,770 |
| Melt Viscosity (KI part) cs.[2] | 60,130 | 88,240 | 50,770 |
| Melt Stability (%) | 83 | 76 | 76 |

[1]Para tertiarybutyl phenol
*100% Brittle Failure
**100% Ductile Failure
[2]Centiseconds Two significant property improvements observed with Chroman-I endcapped polymers were that the unnotched double gate was significantly enhanced by changing from completely brittle to completely ductile and that tensile elongation was increased.

TABLE II

EFFECT OF 3.2 MOLE % CHAIN STOPPER ON PERFORMANCE FOR POLYISOPHTHALATE CARBONATES

| PROPERTY | CHAIN STOPPER | | |
|---|---|---|---|
| | PHENOL | PTBP[1] | CHROMAN-1 |
| Tensile Yield (PSI) | 9956 | 9753 | 9565 |
| Tensile Break (PSI) | 10,620 | 12,280 | 11,670 |
| Tensile Elongation (%) | 80.3 | 107.1 | 99.7 |
| Flexural Yield (PSI) | 14,890 | 14,630 | 14,460 |
| Flexural Modulus (PSI) | 326,900 | 317,600 | 313,200 |
| DTUL (°C.) | 149.6 | 152.4 | 153.1 |
| .125 in. Notched Izod (ft.lbs./in.) | 10.3 | 13.5 | 13.1 |
| .250 in. Notched Izod (ft.lbs/in.) | 2.4 | 2.1 | 2.4 |
| .125 in. Double Gate Izod (ft.lbs./in.) | 39.9* | 34.6* | 37.9** |
| S-Tensile Impact (ft.lbs./in.[2]) | 345 | 305 | 320 |
| Yellowness Index | 4.5 | 4.3 | 5.0 |

TABLE II-continued

EFFECT OF 3.2 MOLE % CHAIN STOPPER ON PERFORMANCE FOR POLYISOPHTHALATE CARBONATES

| PROPERTY | CHAIN STOPPER | | |
|---|---|---|---|
| | PHENOL | PTBP[1] | CHROMAN-I |
| Melt Viscosity (KI,6 min.) cs.[2] | 17,130 | 17,310 | 17,330 |
| Melt Viscosity (KI part) cs.[2] | 15,990 | 15,270 | 15,270 |
| Melt Stability (%) | 93 | 88 | 88 |

[1]Para tertiarybutyl phenol
*100% Brittle Failure
**100% Ductile Failure
[2]Centiseconds The Chroman-I endcapped copolyestercarbonates show an increase in the impact resistance with respect to a shift to a completely ductile break from a completely brittle break in the double gate impact test. In comparison to the data in the Table of U.S. Pat. No. 4,238,596, there is no increase in Notched Izod impact resistance or tensile elongation observed when comparing phenol to Chroman-I in U.S. Pat. No. 4,238,596. The DTUL is increased 3.5° C. by going from phenol to a chroman endcap in Table II.

TABLE III

RETENTION OF IMPACT AFTER VARIOUS HOURS OF EXPOSURE TO HEAT (90° C.) FOR THE 100% POLYISOPHTHALATE COPOLYESTERCARBONATE

| CHAIN STOP-PER | 125 NOTCHED IZOD AFTER HOURS OF EXPOSURE ft.lb./in. | | | | | | | |
|---|---|---|---|---|---|---|---|---|
| | 0 | 1 | 2 | 4 | 8 | 16 | 24 | 48 | 96 |
| Phenol | 10.3 | 3.6 | 3.3 | | | | | | |
| PTBP | 13.5 | 14.9 | 13.4 | 3.8 | 3.4 | | | | |
| Chroman | 13.1 | 13.1 | 14.0 | 13.2 | 13.0 | 13.3 | 4.0 | 13.7 | 14.0 |

In this testing of impact resistance retention after aging the 1/8 inch Notched Izod bar at elevated temperature, the 100 percent polyisophthalate Chroman-I endcapped polycarbonate clearly outperformed the PTBP and phenol endcapped polymer.

When the 100 percent terephthalate Chroman-I endcapped copolyestercarbonates were tested, there was no significant difference over the phenol or PTBP endcapped copolyestercarbonates.

Isophthalate containing copolyestercarbonates are clearly more affected by endcapping agents and are easier to process as the chroman endcapped material than the equivalent terephthalate containing copolyestercarbonate as judged by reduced K.I.

In the following Tables, copolyestercarbonates were tested and prepared from bisphenol-A, terephthaloyl chloride, isophthaloyl chloride and phosgene while utilizing different levels, based on bisphenol-A of the chainstoppers phenol, paratertiarybutylphenol (PTBP) and Chroman-I. The copolyestercarbonate prepared has 78 weight percent ester content of which 93% is isophthalate and 7% is terephthalate.

KI is a measure of melt viscosity of the resin and is calculated according to the procedure of U.S. Pat. No. 4,506,065, column 3, line 60 to column 4, line 13, incorporated by reference.

TABLE IV

| % CHAIN STOPPER | PHENOL | | PTBP | | CHROMAN-I | |
|---|---|---|---|---|---|---|
| | KI CSEC | DTUL °F. | KI CSEC | DTUL °F. | KI CSEC | DTUL °F. |
| 3.5 | 40,270 | 322 | 34,460 | 327 | 47,240 | 327 |
| 4.2 | 26,570 | 319 | 28,830 | 317 | 27,920 | 327 |
| 4.4 | 17,510 | 312 | 19,370 | 323 | 23,430 | 321 |
| 4.6 | 17,970 | 317 | 17,220 | 319 | 19,240 | 325 |

In general, the data of Table IV shows that with Chroman-I as the melt viscosity becomes substantially lowered, the distortion temperature under load is significantly maintained in comparison to either the phenol or PTBP endcapped copolyestercarbonates. Therefore, a more easily processable but still highly temperature resistant polymer is present when a chroman is used as the endcapping agent in higher ester, high isophthalate containing polymers.

In Table V below, the KIs of extruded pellets as well as a molded part are reported. The ⅛ inch Notched Izod, DTUL° F and Yellowness Index of molded parts are also reported. Below are the results:

TABLE V

| MOLE % CHROMAN | KI CS | | ⅛ NI FT.LBS./IN. | DTUL °F. | YI |
|---|---|---|---|---|---|
| | PELLET | PART | | | |
| 3.5 | 44,500 | 39,200 | 10.4 | 326 | 7.4 |
| 4.2 | 27,200 | 23,900 | 10.5 | 326 | 4.9 |
| 4.4 | 23,100 | 20,400 | 10.3 | 324 | 3.7 |
| 4.6 | 19,200 | 18,000 | 10.3 | 326 | 3.5 |

The drop in melt viscosity from pellet to part decreased significantly as the chain stopper level was increased to 4.6% from 3.5%, i.e. from 88% retention to 94% retention. The impact resistance and the DTUL stayed essentially the same while the Y.I. actually improved.

The above noted parts were then tested for impact resistance, ⅛ inch Notched Izod, after aging at 90° C. for a specific number of hours.

TABLE VI

| MOLE % CHROMAN | X = HOURS AT 90° C. WHILE RETAINING INITIAL IMPACT | |
|---|---|---|
| | PTBP | CHROMAN |
| 3.5 | 8 < X < 24 | X > 144 |
| 4.2 | X < 1 | 48 < X < 72 |
| 4.4 | X < 1 | 8 < X < 24 |
| 4.6 | X < 1 | 8 < X < 24 |

From this data it is very clear that the Chroman endcapped copolyestercarbonate retains its impact strength for a substantially longer period of time when aged at an elevated temperature.

In summation, the collected data shows that the use of a chromanyl endcapping agent in comparison to the standard phenol or PTBP endcapping agent for aromatic copolyestercarbonates brings about significant unexpected changes in the properties of the aromatic copolyestercarbonates.

What is claimed is:

1. An aromatic copolyestercarbonate having from above 50 to about 95 mole percent ester content which comprises isophthalate or isophthalate and terephthalate units, said copolyestercarbonate endcapped with a compound of the formula

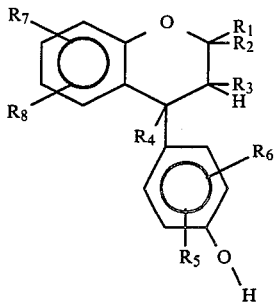

wherein $R_1$–$R_8$ are independently selected from the group consisting of hydrogen and alkyl radicals of 1–9 carbon atoms and wherein $R_5$–$R_8$ are further independently selected from the group consisting of bromo and chloro.

2. The copolyestercarbonate of claim 1 wherein $R_1$, $R_2$ and $R_4$ are methyl and $R_3$, $R_5$, $R_6$, $R_7$ and $R_8$ are hydrogen.

3. The composition of claim 1 wherein the copolyestercarbonate has units of bisphenol-A residue.

4. The composition of claim 3 wherein the copolyestercarbonate has units of isophthalate.

5. The composition of claim 3 wherein the copolyestercarbonate has units of terephthalate.

6. The composition of claim 5 wherein the copolyestercarbonate has units of isophthalate.

7. The composition of claim 6 wherein the ester content of the copolyestercarbonate is at least about 50 mole percent isophthalate.

8. The composition of claim 7 wherein $R_1$, $R_2$ and $R_4$ are methyl and $R_3$, $R_5$, $R_6$, $R_7$ and $R_8$ are hydrogen.

9. The composition of claim 1 wherein there is at least about 70 mole percent ester content.

10. The composition of claim 9 wherein the copolyestercarbonate has units of bisphenol-A residue.

11. The composition of claim 10 wherein the copolyestercarbonate has both units of isophthalate and terephthalate.

12. The composition of claim 11 wherein the ester content of the copolyestercarbonate is at least about 50 percent isophthalate.

13. The composition of claim 12 wherein $R_1$, $R_2$ and $R_4$ are methyl and $R_3$, $R_5$, $R_6$, $R_7$ and $R_8$ are hydrogen.

* * * * *

UNITED STATES PATENT AND TRADEMARK OFFICE
CERTIFICATE OF CORRECTION

PATENT NO. : 4,788,275
DATED : November 29, 1988
INVENTOR(S) : Kenneth Frederick Miller It is certified that error appears in the above-identified patent and that said Letters Patent is hereby corrected as shown below:

Col. 1, line 18, "pheno" should read --phenol--

Signed and Sealed this

Seventeenth Day of July, 1990

Attest:

HARRY F. MANBECK, JR.

*Attesting Officer*  *Commissioner of Patents and Trademarks*